US009019702B2

(12) United States Patent
Lee

(10) Patent No.: US 9,019,702 B2
(45) Date of Patent: Apr. 28, 2015

(54) PORTABLE TERMINAL WITH SUPPORT PLATE

(71) Applicant: Samsung Electronics Co., Ltd., Gyeonggi-do (KR)

(72) Inventor: Yong-Seok Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 231 days.

(21) Appl. No.: 13/669,657

(22) Filed: Nov. 6, 2012

(65) Prior Publication Data

US 2013/0176681 A1 Jul. 11, 2013

(30) Foreign Application Priority Data

Jan. 11, 2012 (KR) ........................ 10-2012-0003412

(51) Int. Cl.
*G06F 1/16* (2006.01)
(52) U.S. Cl.
CPC .............. *G06F 1/1626* (2013.01); *G06F 1/166* (2013.01)
(58) Field of Classification Search
CPC ................................ G06F 1/166; G06F 1/1626
USPC ........................................ 361/679.55, 679.56
See application file for complete search history.

(56) References Cited

U.S. PATENT DOCUMENTS

| | | | | | |
|---|---|---|---|---|---|
| 5,199,888 | A | * | 4/1993 | Condra et al. ................. | 439/142 |
| 5,375,076 | A | * | 12/1994 | Goodrich et al. ........ | 361/679.17 |
| 5,738,536 | A | * | 4/1998 | Ohgami et al. ............... | 439/142 |
| 6,002,581 | A | * | 12/1999 | Lindsey .................... | 361/679.55 |
| 6,757,160 | B2 | * | 6/2004 | Moore et al. ............. | 361/679.55 |
| 7,102,880 | B2 | * | 9/2006 | Minaguchi et al. ....... | 361/679.55 |
| 7,301,759 | B2 | * | 11/2007 | Hsiung .................... | 361/679.27 |
| 7,561,420 | B2 | * | 7/2009 | Chueh et al. ............. | 361/679.59 |
| 7,889,498 | B2 | | 2/2011 | Diebel et al. | |
| 8,089,760 | B2 | * | 1/2012 | Yi-Chang ................ | 361/679.59 |
| 8,111,512 | B2 | * | 2/2012 | Yeh et al. ................ | 361/679.59 |
| 8,248,789 | B2 | * | 8/2012 | Wu et al. ................. | 361/679.56 |
| 8,456,834 | B2 | * | 6/2013 | Zhu et al. ................ | 361/679.56 |
| 8,582,293 | B2 | * | 11/2013 | Okamoto ................. | 361/679.55 |
| 8,670,232 | B2 | * | 3/2014 | Bliven et al. ............. | 361/679.55 |
| 2005/0052831 | A1 | | 3/2005 | Chen | |
| 2006/0028791 | A1 | * | 2/2006 | Huang et al. ................... | 361/683 |
| 2006/0109617 | A1 | * | 5/2006 | Chen et al. ..................... | 361/683 |
| 2008/0068786 | A1 | * | 3/2008 | Cheng et al. ................... | 361/683 |
| 2008/0074834 | A1 | * | 3/2008 | Chien et al. ..................... | 361/683 |
| 2009/0147469 | A1 | * | 6/2009 | Chen et al. ............... | 361/679.55 |

(Continued)

FOREIGN PATENT DOCUMENTS

| | | |
|---|---|---|
| JP | 03-026914 A | 2/1991 |
| JP | 2000-132278 A | 5/2000 |

(Continued)

*Primary Examiner* — Lisa Lea Edmonds
(74) *Attorney, Agent, or Firm* — Cha & Reiter, LLC.

(57) ABSTRACT

A portable terminal includes: a body having a display device provided on the front face thereof; a support plate pivotably installed on the rear face of the body, a receiving recess formed on the rear face of the body adapted to receive the support plate; and wherein the support plate can pivot from the position of being received in the receiving recess, to articulate to a position protruding from the rear face of the body. By being provided with the support plate capable of cradling the body slantingly, the portable terminal makes it needless to carry a separate cover or case for providing a cradle function, which can contribute to maintaining the miniaturized and slimmed appearance of the terminal that is easy to carry.

17 Claims, 5 Drawing Sheets

(56) References Cited

U.S. PATENT DOCUMENTS

| | | |
|---|---|---|
| 2010/0103610 A1* | 4/2010 | Lin .................... 361/679.55 |
| 2010/0142130 A1* | 6/2010 | Wang et al. ............. 361/679.01 |
| 2011/0077061 A1 | 3/2011 | Danze et al. |
| 2011/0285258 A1 | 11/2011 | Yuan |

FOREIGN PATENT DOCUMENTS

| | | |
|---|---|---|
| KR | 10-2004-0095406 A | 11/2004 |
| KR | 10-0560921 B1 | 3/2006 |
| KR | 10-0790106 B1 | 1/2008 |

\* cited by examiner

PORTABLE TERMINAL WITH SUPPORT PLATE

CLAIM OF PRIORITY

This application claims the benefit of priority under 35 U.S.C. §119(a) from a Korean patent application entitled "Portable Terminal With Support Plate" filed in the Korean Industrial Property Office on Jan. 11, 2012 and assigned Ser. No. 10-2012-0003412, the contents of which are hereby incorporated by reference in its entirety.

BACKGROUND OF THE INVENTION

1. Field of the Invention

The present invention relates to a portable terminal, and in particular including but not limited to a portable terminal capable of self-cradling.

2. Description of the Related Art

In general, a portable terminal means a device that provides a function for allowing a user to communicate with another user or to access a service provided by a service provider through a mobile communication station while the user is carrying the terminal. The types of services available through a portable terminal have expanded rapidly with the advancement of mobile communication and information communication technologies. For example, although the early mobile communication services were limited to calling a counterpart, voice communication, short message transmission or the like, the types of services available have gradually expanded to include music and multimedia service, such as reproducing still/moving images, entertainment services, such as games, business and financial service's such as mobile banking, document editing, calendar and time management applications. Moreover, the users of the mobile communication services have been gradually popularized amongst the young and the elderly alike.

Recently, multimedia services available through portable terminal devices have become more robust. In addition, portable terminals, such as smart phones and tablet PCs, that are functionally nearly at the level of conventional personal computers, have become more widely available to consumers. Therefore, an environment exists in which an individual is capable of accessing the Internet or enjoying still/moving pictures, and even performing office work using a smart phone or a tablet PC while he or she is mobile. Typically portable terminals are equipped with a display device employing a touch screen which may incorporate a virtual keyboard or data entry device in place of an actual physical keyboard. Therefore it becomes possible for portable terminals to have an enlarged display while continuing to minimize the total size of the portable terminal. Through this, both the usability and portability of portable terminals have been increased because the touch screen can include and implement a keyboard on the screen thereof, thus allows a user to activate and use the keyboard function only when it is needed.

Unlike mobile communication terminals or portable game machines, tablet PCs occasionally provide a cradle function using an accessory, such as a separate cover or case. In other words, because tablet PCs are larger and heavier as compared to mobile communication terminals such as a smart phone or portable game machines, holding and using a tablet PC for a long time may be difficult for a user. Accordingly, tablet PC users usually purchase a separate cover or case to use as a cradle for a tablet PC as well as to protect the tablet PC.

However, carrying a separate cover or case not only troubles a user but also the cover or case may be lost or misplaced. In addition, it is inconvenient to carry the cover or case in a state in which it is mounted on a portable terminal. Furthermore, mounting a separate cover or case on a portable terminal is contrary to the goal of the tendency of miniaturizing and slimming portable terminals.

SUMMARY OF THE INVENTION

Accordingly, an aspect of the present invention is to solve the above-mentioned problems occurring in the prior art, and to provide a portable terminal having a support plate, so that the portable terminal can be of minimal size, easily carried as well as self-cradled.

Another aspect of the present invention is to provide a portable terminal having a support plate for providing a cradle function, wherein the support plate is pivotably coupled to the body of the portable terminal so that the support plate is not in danger of being lost.

Also, another aspect of the present invention is to provide a portable terminal that does not have include any additional external equipment or components such as a cover or case for providing a cradle function, so that the terminal maintains its small size and thin profile.

Moreover, another aspect of the present invention is to provide a portable terminal having a support plate that can contribute to the improved design and appearance of the portable terminal.

In accordance with an aspect of the present invention, there is provided a portable terminal including: a body having a display device provided on the front face thereof; a receiving recess formed on the rear face of the body; and a support plate pivotably installed on the rear face of the body to pivot about an axis of rotation, such that the support plate may go in and out of the receiving recess on the rear face of the body, wherein from the state of being received in the receiving recess, the support plate pivots to protrude from the rear face of the body.

In accordance with another aspect of the present invention, there is provided a portable terminal including: a body having a display device provided on the front face thereof; one or more attachments detachably provided on the rear face of the body; and a support plate pivotably installed on the rear face of the body to pivot about an axis of rotation, such that the support plate may go in and out of the receiving recess on the rear face of the body, wherein the support plate opens/closes the attachments as it pivots, and when in the state of protruding from the rear face of the body, the support plate is utilized as a cradle.

BRIEF DESCRIPTION OF THE DRAWINGS

The above and other aspects, features and advantages of the portable terminal with support plate according to the present invention will become more apparent to one of ordinary skill in the art from the following detailed description taken in conjunction with the accompanying drawings, in which.

DETAILED DESCRIPTION OF EMBODIMENTS

Figure 1:
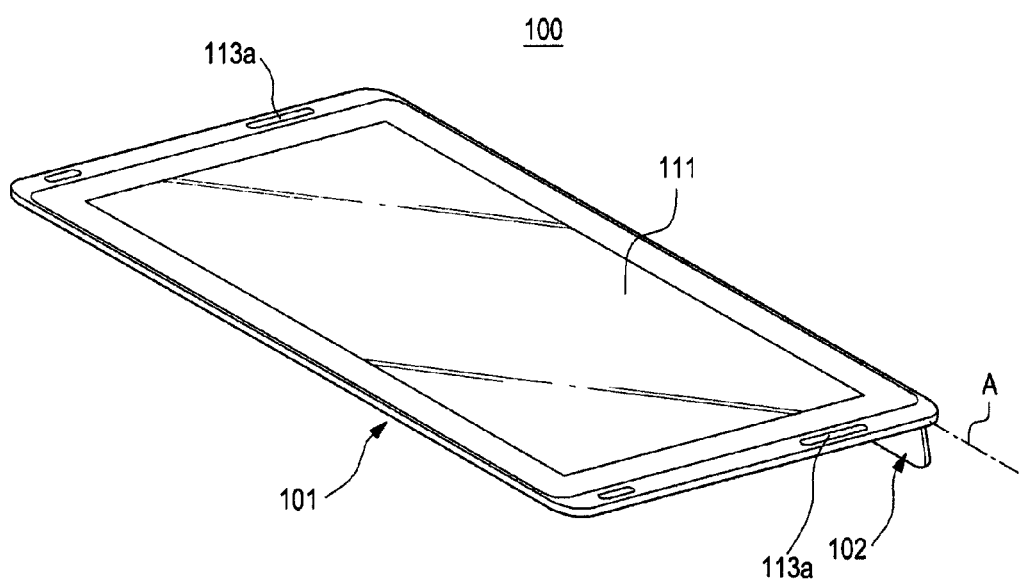
FIG. 1 is a perspective view showing a portable terminal in accordance with an embodiment of the present invention.

Hereinafter, exemplary embodiments of the present invention will be described with reference to the accompanying drawings. In the following description of the present invention, a detailed description of well-known functions, construction and configurations incorporated herein may not be described in detail when they would obscure appreciation of the present invention by a person of ordinary sill in the art or when such detail may make the subject matter of the present invention rather unclear. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art.

As shown in FIGS. 1 to 5, the portable terminal 100 in accordance with the present invention includes: a body 101 having a display device 111 provided on the front face thereof; and a support plate 101 pivotably coupled to the rear face of the body 101, wherein the support plate 102, goes in and out of the rear face of the body as it pivots on the rear face of the body 101. That is, the support plate 102 can be folded to lie adjacent and parallel to the rear face of the body 101 or protrude at an angle from the rear face of the body 101.

In accordance with the present invention, the display device 111 typically incorporates touch screen functionality, as such the terminal 100 may not be provided with a separate input device, such as a keyboard. However, a user may use the terminal 100 in a state in which the terminal 100 is connected to or docked with a separate keyboard through a docking station method or a wireless short range communication method and protocol, such as Bluetooth.

Turning again to FIGS. 1-5, there is shown, a pair of speaker holes 113a for outputting sounds are provided on the opposite side edges of the front face of the body 101, respectively, and an interface terminal 113b is provided on a lateral side for charging or connecting the portable terminal with an external device, such as a personal computer. In addition, a receiving recess 115 for receiving the support plate 102, and slots 119a for providing spaces for mounting a camera module 117 and a storage medium are provided on the rear face of the body 101. A printed pattern 119b, such as a logo of a manufacturing company of the terminal 100 or a communication company supplied with the terminal 100, may be arranged in the receiving recess 115. The printed pattern 119b may be formed by attaching a sticker or the like or carving the pattern on the case of the body 101. It should be understood by one skilled in the art that the speaker holes 113a, and interface terminal 113b, slots 119a and spaces for mounting a camera module 117 may be placed in alternate locations corresponding to the particular portable terminal 100 and its specific design.

The receiving recess 115 is formed adjacent to either a top or bottom end of the rear face of the body 101, and extends in the longitudinal direction of the body 101. In addition, the receiving recess 115 is depressed by a predetermined depth from the rear face of the body 101 to receive the support plate 102. The depth of the receiving recess 115 typically will correspond to the thickness of the support plate 102. Therefore, the outer surface of the support plate 102 may be flush with the rear face of the body 101 in the state of being received in the receiving recess 115.

Although a specific embodiment of the present invention exemplified a construction in which the support plate 102 is capable of being received in the receiving recess 115 to open/close only a region on the rear face of the body, the receiving recess 115 is not necessarily formed. For example, the support plate 102 may be formed in a size capable of opening/closing the entirety of the rear face of the body 101, in which case it is not necessary to form the receiving recess 115. In such a configuration where there is no receiving recess formed, the support plate 115 may lie in parallel adjacent orientation against the rear face of the body 101 when the support plate is in a closed position.

In addition, although the embodiment exemplified a construction in which only the camera 117 and the slots 119a are arranged in the region opened/closed by the support plate 102 on the rear face of the body 101, an additional slot for mounting a battery pack may be formed in the region. In addition, various attachments, such as an expansion card for strengthening a communication or graphic function or the like, or a game pack with high-capacity contents, may be mounted through the slots 119a.

The camera module 117 may be provided in the receiving recess 115 to be opened/closed by the support plate 102. However, an opening 121 may be formed through the support plate 102 so as to make photographing be enabled even in the state in which the support plate 102 is received in the receiving recess 115. That is, in the state in which the support plate 102 is received in the receiving recess 115, the camera module 117 is received in the opening 121 to be exposed to the outside in such a manner that a photographing path can be maintained.

The slots 119a are provided as spaces for coupling storage mediums, such as a memory card and a subscriber identity module. In order to keep a proper connection condition with connection pins (not shown) provided on the terminal 100, each of the storage mediums may be inserted into one of the slots 119a by a predetermined length. The remaining portions of the storage mediums not inserted into the corresponding slots 119a are exposed and extend into the receiving recess 115 so that the user can grasp the exposed portion and extract the storage mediums as needed. However, in the state in which the support plate 102 is received in the receiving recess 15, the slots 119a are also concealed by the support plate 102. In this configuration, the rotation axis A of the support plate 102 is preferably arranged on one longitudinal edge of the receiving recess 115, and the slots 119a are preferably arranged along the other longitudinal edge to be spaced apart from the rotation axis A by a lateral distance. By arranging the rotation axis A and the slots 119a to be spaced from one another, it is possible to secure a sufficient space for allowing the user to mount or extract the storage mediums when the support plate 102 pivots to open the slots 119a.

In general, a portable terminal with a removable battery pack may provide slots for mounting a storage medium or the like using a battery pack mounting space or a space concealed by a battery cover. In such a portable terminal provided with the removable battery pack, the slots for mounting the storage mediums or the like may not be exposed to the outside. Whereas, in the case of a terminal having a battery pack completely housed in the terminal so that a user cannot replace the battery pack, the slots for mounting the storage mediums or the like are inevitably exposed to the outside, and the exposed slots are concealed by a separate cover.

In the case of the portable terminal 100 according to the present invention, the support plate 102 is pivotably coupled to the body 101 as described above, and the slots 119 for mounting a memory card, a subscriber identity module or the like are arranged in the region opened/closed by the support plate 102. Therefore, even in a structure in which the battery pack is housed in the body so that a user cannot replace the battery pack, it is not necessary to arrange a separate cover on the slots 119 for mounting a memory card, a subscriber identity module or the like. That is, the support plate 102 itself can be used as a cover for concealing the slots 119a. In addition, as described above, it is possible to provide a slot for inserting and mounting a battery pack in the region opened/closed by the support plate 102.

By pivotably coupling the support plate 102 to the body 101 as well as by forming the receiving recess 115 and the slots 115 for mounting a storage medium or the like on a part of the rear face of the body 101 opened/closed by the support plate 102, it is possible to maintain an appealing appearance of the terminal 100. That is, in a construction in which a separate cover is arranged to conceal the slots for mounting storage mediums or the like, a boundary line or seam exists between the cover and the body which is visible from the outside. The separation between the separate cover and terminal can ruin the appearance and design of the terminal. However, the portable terminal 100 according to the present invention conceals the slots 119a for mounting storage mediums or the like using the support plate 102 that can be used as a cradle, whereby the appearance of the portable terminal can be maintained.

Figures 2A, 2B:
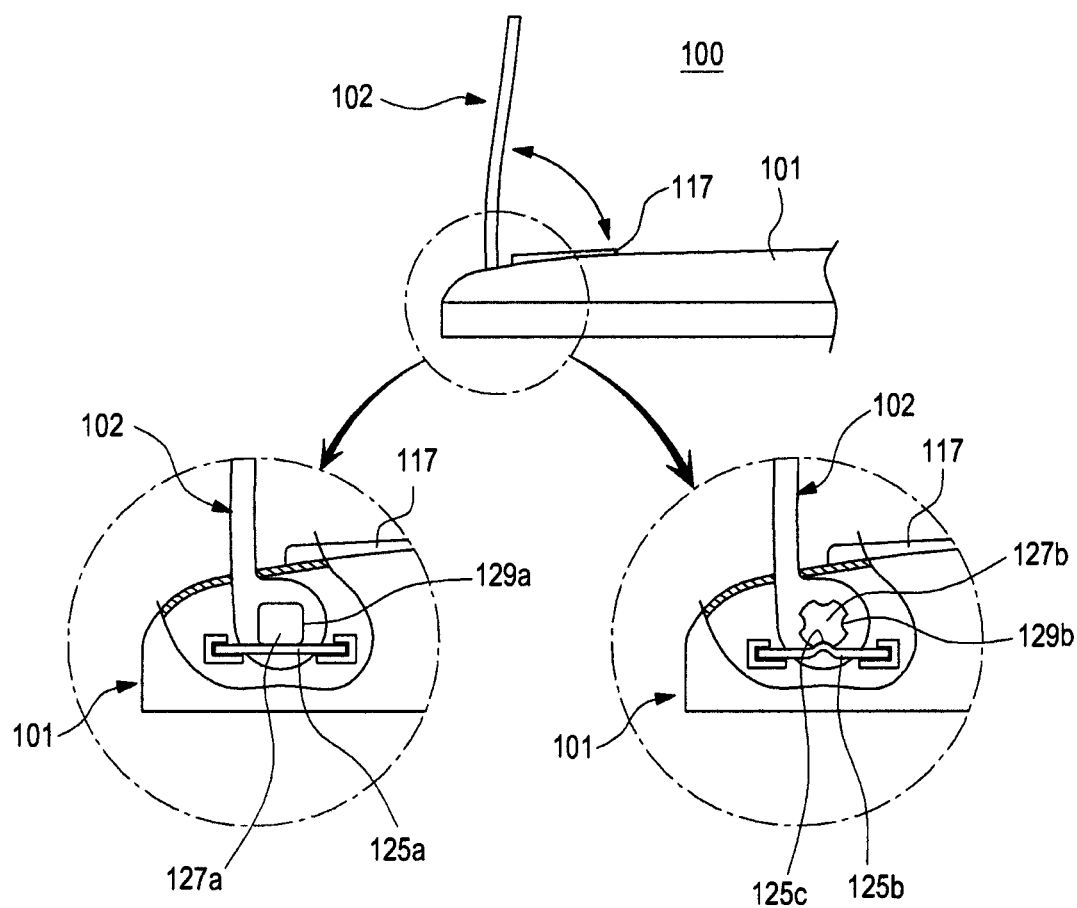
FIG. 2A is an expanded view showing a part of the portable terminal of FIG. 1 in an enlarged scale.
FIG. 2B is an expanded view showing a part of the portable terminal of FIG. 1 in an enlarged scale
Figure 3:
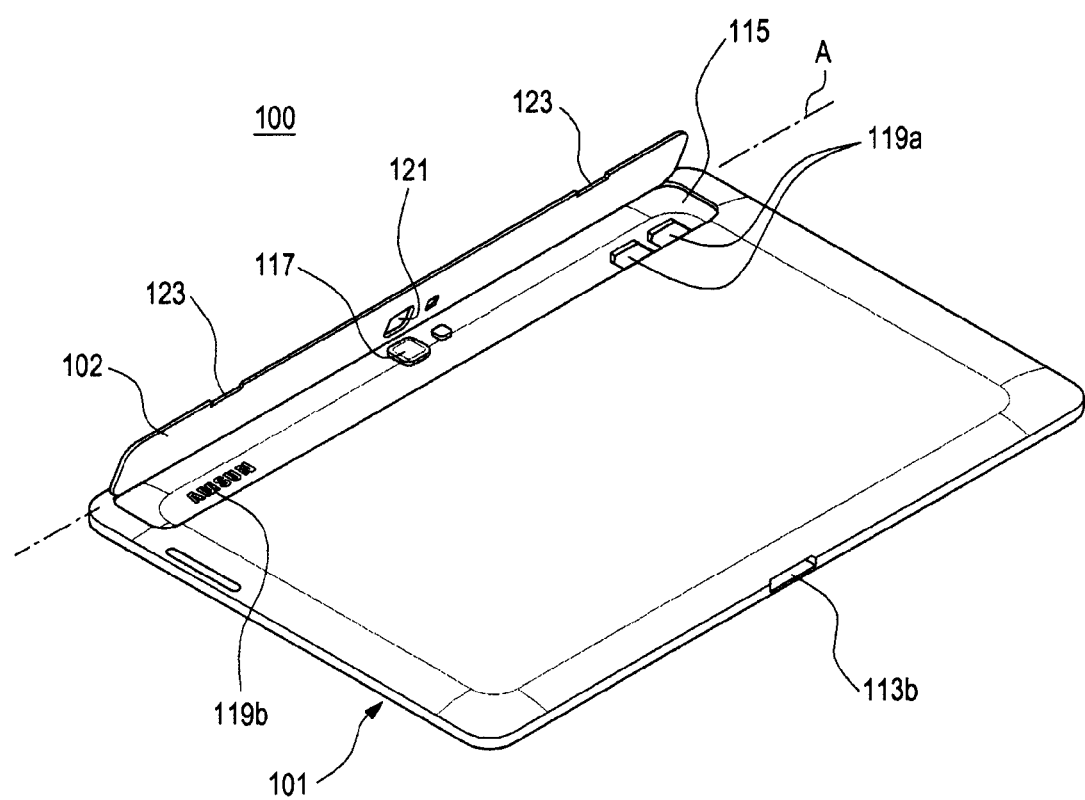
FIG. 3 is a perspective view showing the rear face of the portable terminal of FIG. 1
Figure 4:
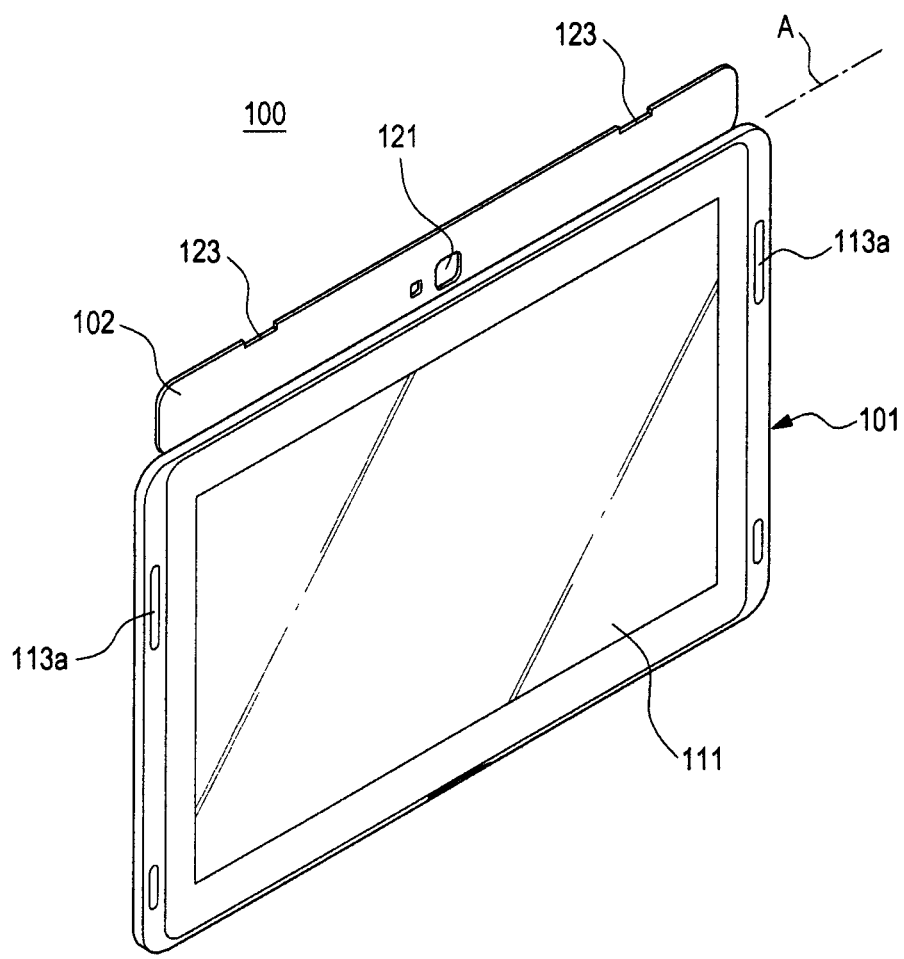
FIG. 4 is a perspective view showing the support plate of the portable terminal of FIG. 1 in the state of pivoting to an angular point of 180 degrees.
Figure 5:
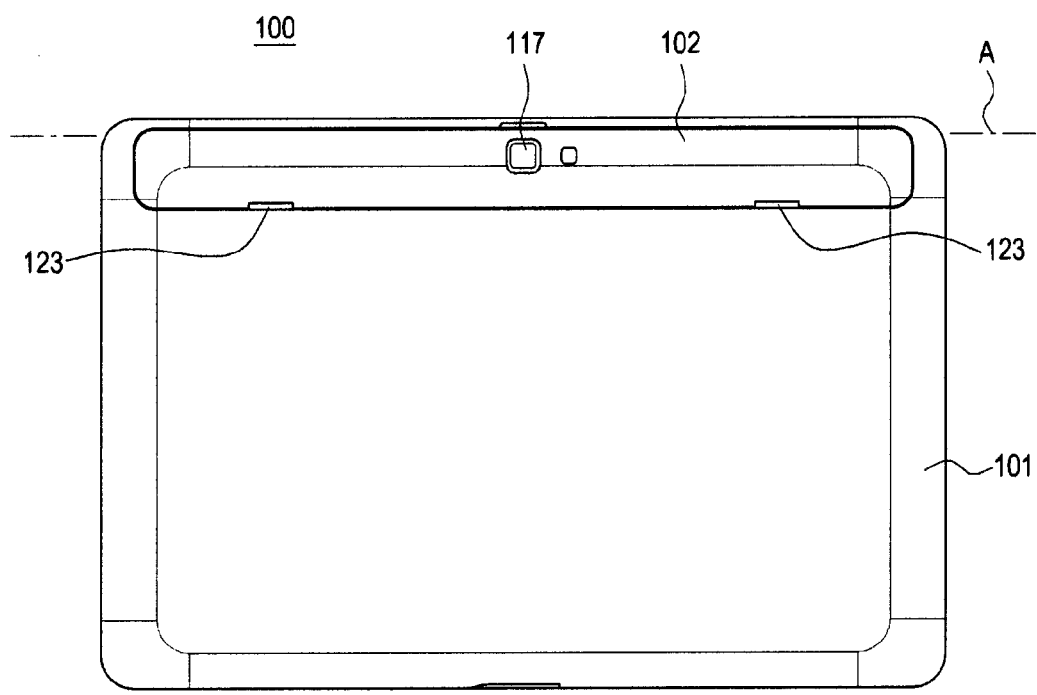
FIG. 5 is a view showing the support plate of the portable terminal of FIG. 1 in the state of being received in the receiving recess of the body of the portable terminal.

Meanwhile, the support plate 102 may pivot from the state of being received in the rear face of the body 101 recess 115 to be stopped at an angular point of 90 degrees as shown in FIGS. 1 to 3, or to be retained in the state of being stopped at an angular point of 180 degrees as shown in FIG. 4.

In the position in which the support plate 102 is opened by 90 degrees from the rear face of the body 101, the user may use the support plate 102 to cradle the terminal 100 on a flat surface such as a table or desk. At this time, the body 101 may be slantingly positioned at an angle of about 10 degrees in relation to the flat surface although there may be a difference depending on the size of the support plate 102. In this state, the portable terminal 100 is in a convenient position for the user to enjoy moving pictures or the like, or to activate a keyboard through the display unit 111.

In the position in which the support plate 102 is opened by 180 degrees from the rear face of the body 101 as shown in FIG. 4, the user may use the portable terminal 100 by using the support plate 102 to hang the portable terminal 100 on a wall or other vertical surface. In that event, the opening 121 may be utilized as a wall-hanging hole. When used as a wall-hang form, the terminal 100 may be utilized as a digital frame or clock or to watch multimedia presentations. In addition, in an environment in which both hands should be used, such as in a kitchen or workshop, the user can usefully utilize the terminal 100 to output required information on the screen of the portable terminal by hanging the terminal 100 on the wall. Furthermore, when enjoying multimedia files stored in the terminal 100 through an external device, such as a television set or a computer, or streaming-serviced through the terminal 100, it is possible to hang the terminal 100 on the wall adjacent to the external device, and to connect the terminal 100 with the external device with a cable.

Turning to FIGS. 2A and 2B, the terminal 100 support plate 102 may be provided with cam members 127a and 127b and resilient leaf springs 125a and 125b in order to retain the support plate 102 in the state of being stopped at a predetermined angular point. One skilled in the art will recognize that the resilient leaf springs may be made of any sufficiently resilient material having a shape memory and a predetermined spring rate. Moreover, the configuration shown for leaf springs 125a and 125b are exemplary and the leaf springs may adopt other configurations which enable force to be exerted upon cam members 127 and 127b.

The cam members 127a and 127b are provided at least at one end, preferably at the opposite ends of the support plate 102, respectively. The cam members 127a and 127b are arranged on the rotation axis A of the support plate 102, and rotated about the rotation axis A when the support plate 102 pivots. The leaf springs 125a and 125b are anchored to the interior of the body 101 to compress the outer peripheral surfaces of the cam members 127a and 127b, respectively. Therefore, when the support plate 102 pivots, the cam members 127a and 127b are in contact with the leaf springs 125a and 125b, and exert a force against the surface of the cam members. When the support plate 102 is in the stopped state, static friction force between the cam members 127a and 127b and the leaf springs 125a and 125b is applied to retain the support plate 102 in the stopped state. Also, in the state of being received in the receiving recess 115, the pivoting of the support plate 102 is suppressed by the static friction force between the cam members 127a and 127b and the leaf springs 125a and 125b. Therefore, the terminal 100 may further include one or more handling notches or grooves 123 in order to allow a user to easily grasp the support plate 102 and make the support plate 102 pivot about axis A Although the present embodiment exemplifies a construction in which the handling notches or grooves 123 are formed along a longitudinal edge of the support plate 102, the handling notches or grooves 123 may be formed on an inner wall of the receiving recess 115. However, it shall be noted that each of the handling grooves 123 should be formed at a position sufficiently spaced from the rotation axis A, thereby minimizing the force needed to rotate the support plate. Therefore, in the present embodiment, the rotation axis A is arranged on one longitudinal edge of the support plate 102, and the handling grooves 123 are formed on the other longitudinal edge.

If the support plate 102 is received in the receiving recess 115, the other longitudinal edge will be engaged with the corresponding inner wall of the receiving recess 115, in which case the handling grooves 123 are positioned to be spacedly opposite to the inner wall of the receiving recess 115. Therefore, even in the state in which the support plate 102 is received in the receiving recess 115, the user can rotate the support plate 102 using the spaces between the handling grooves 123 and the inner wall of the receiving recess 115.

In order to retain the support plate 102 in the stopped state at a predetermined position more stably, FIG. 2A depicts at least one flat surface 129a and at least one latching groove 129b may be formed on the peripheral surfaces of the cam members 127a and 127b, respectively.

If the flat surface 129a is formed on the peripheral surface of the cam member 127a, the stopped state of the support plate can be stably retained at a position where the flat surface 129a comes into close contact with the leaf spring 125a. If plural flat surfaces are formed on the peripheral surface of the cam member 127a from the position at which the support plate 102 is received in the receiving recess 115 to the position at which the support plate 102 is opened by 180 degrees from the received position, the stopping angle of the support plate 102 can be variously set. However, such flat surfaces are preferably provided at least at two points, i.e. at a point where the support plate 102 is received in the receiving recess 115, and at a point where the support plate 102 pivots and opened by about 90 degrees. Of course, one flat surface may also be formed so that the support plate 102 can be retained at the angular point of 180 degrees. However, because the terminal 100 is mainly used as a wall-hanger form in the state in which the support plate 102 is stopped at the angular point of 180 degrees, the support plate 102 can be retained in the state of being stopped at the angular point of 180 degrees due to the weight of the body 101 even if such a flat surface is not formed. Therefore, it will be more desirable to form at least one pair of flat surfaces.

As depicted in FIG. 2B, if plural latching grooves 129b are formed on the cylindrical peripheral surface of the cam member 127b, a part 125c of the leaf spring 125b may be bent so that the bent part 125c of the leaf spring 125b can be engaged with one of the latching grooves 129b. The bent part 125c of the leaf spring 125b is engaged with one of the latching grooves 129b when the support plate 102 is received in the receiving recess 115 or when the support plate 102 pivots and arrives at the angular point of 90 degrees. Although such a latching groove may also be arranged to be engaged with the bent part 125c of the leaf spring 125b when the support plate 102 pivots from the body 101 and stopped at the angular point of 180 degrees, it will be more desirable that the latching grooves are arranged in such a manner that the support plate 102 can be retained in the stopped state when it is received in the receiving recess 115 and when it pivots and opened by 90 degrees, like the configuration having the flat surfaces 129a.

With respect to both cam member 127a and 127b, one skilled in the art will recognize that the cams may include more than the depicted four flat surfaces 129a or latching grooves 129b. In that way the support plate 102 may be retained in any number of angular positions with respect to the rear face of the body 101.

Because the portable terminal according to the present invention as described above has a support plate capable of cradling the body of the portable terminal slantingly, it is needless to carry a separate cover or case for providing a cradle function, which makes it easier to carry the terminal In addition, as being pivotably coupled to the body of the terminal, the support plate does not interfere with maintaining the miniaturized and slimmed appearance of the terminal without a danger of being lost. Furthermore, because slots for mounting a battery pack as an attachment for a conventional tablet PC or the like, a storage medium, such as a memory card or a subscriber identity module (SIM), or the like that is exposed to the outside of the terminal, can be concealed by the support plate, the appearance design of the terminal can be improved.

While the invention has been shown and described with reference to certain exemplary embodiments thereof, it will be understood by those skilled in the art that various changes in form and details may be made therein without departing from the spirit and scope of the invention as defined by the appended claims.

For example, an interface terminal for connecting the portable terminal with an external device may also be positioned in the receiving recess 115, and if the interface terminal is positioned in the receiving recess 115, the interface terminal may be provided at a position corresponding to or adjacent to the position of the camera module 117. In such a case, an opening 121 formed through the support plate 102 may expose the interface terminal positioned in the receiving recess 115, and the interface terminal positioned adjacent to the camera module can be received as the support plate 102 additionally includes the opening 121.

What is claimed is:

1. A portable terminal comprising:
   a body having a display device provided on a front face thereof;
   a support plate pivotably installed on a rear face of said body,
   a receiving recess formed on said rear face of said body, said receiving recess being adapted to receive said support plate; and
   at least one cam member provided on a rotation axis of said support plate, said cam member being disposed inside said body, and said cam member being coupled to said support plate;
   wherein said support plate is arranged to pivot from a first position in which said support plate is received in said receiving recess, to a second position in which said support plate protrudes from said rear face of said body; and
   wherein said cam member is rotated about said rotation axis when said support plate pivots from said first position to said second position.

2. The portable terminal as claimed in claim 1, further comprising at least one handling groove along an edge of said support plate,
   wherein when said support plate is in said first position, the edge of said support plate is engaged with an inner wall of said receiving recess and said handling groove is positioned to be spacedly opposite to said inner wall of said receiving recess.

3. The portable terminal as claimed in claim 1, wherein when said support plate is in said second position, said support plate is retained at a predetermined angular displacement of 90 or 180 degrees.

4. The portable terminal as claimed in claim 1, further comprising a printed pattern arranged in said receiving recess, wherein said printed pattern may be covered when said support plate is received within said receiving recess.

5. A portable terminal comprising:
   a body having a display device provided on a front face thereof;
   a support plate pivotably installed on a rear face of said body, wherein a first opening formed in said support plate,
   a receiving recess formed on said rear face of said body, said receiving recess being adapted to receive said support plate; and
   a camera module positioned in said receiving recess;
   wherein said support plate is arranged to pivot from a first position in which the support plate is received in said receiving recess, to a second position in which the support plate protrudes from said rear face of said body; and
   wherein said camera module is exposed through said first opening when said support plate is in said first position.

6. A portable terminal comprising:
   a body having a display device provided on a front face thereof;
   a support plate pivotably installed on a rear face of said body,
   a receiving recess formed on said rear face of said body adapted to receive said support plate; and
   at least one slot formed in said receiving recess to provide a space for mounting an attachment,
   wherein said slot is covered by said support plate when said support plate is received by said receiving recess; and
   wherein said support plate is arranged to pivot from a first position in which said support plate is received in said receiving recess, to a second position in which said support plate protrudes from said rear face of said body.

7. The portable terminal as claimed in claim 6, wherein said support plate has a rotation axis arranged adjacent to one edge of said receiving recess, and said slot is arranged adjacent to another edge of said receiving recess.

8. The portable terminal as claimed in claim 1, further comprising:
   at least one leaf spring anchored to an interior structure of said body; and
   wherein a peripheral surface of said cam member is supported by said leaf spring.

9. The portable terminal as claimed in claim 8, further comprising at least one pair of flat surfaces formed on said peripheral surface of said cam member,
   wherein as said leaf spring comes into close contact with any one of said flat surfaces, said leaf spring exerts a force on that flat surface, such that said support plate is retained at a predetermined angular position of 90 degrees or 180 degrees.

10. The portable terminal as claimed in claim 8, wherein said cam member is formed in a cylindrical shape having plural latching grooves on said peripheral surface, and a part of said leaf spring is resiliently engaged with one of said latching grooves to retain said support plate in at a predetermined angular position of 90 degrees or 180 degrees.

11. A portable terminal comprising:
   a body having a display device provided on a front face thereof;
   one or more attachments detachably provided on a rear face of said body; and
   a support plate pivotably installed on said rear face of said body;
   a receiving recess formed on said rear face of said body adapted to receive said support plate;
   at least one leaf spring anchored to an interior structure of the body; and
   at least one cam member coupled to said support plate, the at least one cam member being provided on a rotation axis of said support plate;
   wherein said support plate is arranged to pivot from a first position in which said support plate received in said receiving recess, to a second position in which said support plate is protruding from said rear face of said body;
   wherein said cam member is rotated about said rotation axis when said support plate pivots from said first position to said second position;
   wherein a peripheral surface of said cam member is supported by said leaf spring when said support plate is at least one of said first position and said second position; and
   wherein said support plate is utilized as a cradle when said support plate is in said second position.

12. The portable terminal as claimed in claim 11, wherein a first opening is formed through said support plate, said attachments are provided on said rear face of said body, and one of said attachments is exposed through said first opening while said support plate is in said first position.

13. The portable terminal as claimed in claim 12, wherein said attachment exposed through said first opening is a camera module.

14. The portable terminal as claimed in claim 11, further comprising one or more slots formed on said rear face of said body, wherein said attachments are a storage medium and a battery pack provided to be mounted in said slots, respectively, and said support plate is arranged to cover said slots when said support plate is in said first position.

15. The portable terminal as claimed in claim 14, wherein said slots are formed at a location in said receiving recess that is spaced from said rotation axis of said support plate in a region of said receiving recess that is covered by said support plate when said support plate is in said first position.

16. The portable terminal as claimed in claim 11, wherein said support plate is retained in a stopped position at an angular point of 90 degrees or at an angular point of 180 degrees.

17. The portable terminal as claimed in claim 11, further comprising:
   at least one handling groove formed along an edge of said support plate, wherein when said support plate is in said first position said support plate is engaged with an inner wall of said receiving recess, and said handling groove is positioned opposite to said inner wall of said receiving recess.

* * * * *